(12) United States Patent
Zumberge et al.

(10) Patent No.: US 6,564,694 B2
(45) Date of Patent: May 20, 2003

(54) DUAL HALL EFFECT SENSOR FOR DETERMINING TRAVEL

(75) Inventors: Jon T. Zumberge, Dayton, OH (US); Alan H. Green, Germantown, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/897,818

(22) Filed: Jun. 29, 2001

(65) Prior Publication Data

US 2003/0000375 A1 Jan. 2, 2003

(51) Int. Cl.$^7$ ................................................ F01B 25/26
(52) U.S. Cl. ........................................ 92/5 R; 60/534
(58) Field of Search ...................... 60/534, 545; 92/5 R

(56) References Cited

U.S. PATENT DOCUMENTS

| | | | |
|---|---|---|---|
| 4,124,814 A | 11/1978 | Lauerman | 324/208 |
| 4,914,916 A | 4/1990 | Leigh-Monstevens et al. | 60/534 |
| 5,115,186 A * | 5/1992 | Reinartz et al. | 188/1.11 E |
| 5,246,281 A | 9/1993 | Leppek | 303/114.1 |
| 5,439,275 A | 8/1995 | Padula et al. | 303/3 |
| 5,558,409 A | 9/1996 | Walenty et al. | 303/10 |
| 5,608,317 A | 3/1997 | Hollmann | 324/207.2 |
| 5,636,548 A | 6/1997 | Dunn et al. | 73/313 |
| 5,793,200 A | 8/1998 | Berrill | 324/207.2 |
| 5,825,287 A | 10/1998 | Zarybnicky, Sr. et al. | 340/453 |
| 6,100,681 A | 8/2000 | Tsuruta | 324/207.2 |
| 6,105,730 A | 8/2000 | Ekeroth | 188/1.11 |
| 6,160,395 A | 12/2000 | Goetz et al. | 324/207.21 |

* cited by examiner

Primary Examiner—Edward K. Look
Assistant Examiner—Thomas E. Lazo
(74) Attorney, Agent, or Firm—Scott A. McBain

(57) ABSTRACT

A non-contact Hall Effect position sensor integral to a master cylinder for an automotive hydraulic braking system provides reliable brake pedal position information without regard to the geometry and placement of the brake pedal input, decreasing the complexity of integration into each type of automobile. Moreover, reliable performance of brake position sensing is provided by avoiding use of contact sensors that are subject to wear and performance variation.

6 Claims, 6 Drawing Sheets

DUAL HALL EFFECT SENSOR FOR DETERMINING TRAVEL

FIELD OF THE INVENTION

The present invention relates to a noncontact sensor for longitudinal travel, and more particularly, to brake pedal position sensing integral to a master cylinder for an automotive hydraulic braking system.

BACKGROUND OF THE INVENTION

Automobiles have long incorporated hydraulic wheel braking systems that rely upon a master cylinder to supply hydraulic pressure to disk brake calipers or drum brake actuators in response to brake pedal pressure. The driver adjusts the amount of pedal pressure to accommodate variations in stopping performance and driving conditions.

More recently, improvements to hydraulic braking systems have enhanced performance and safety. For instance, Electro-Hydraulic Braking (EHB) systems automatically adjust a commanded degree of braking to accommodate variations in the braking system and driving conditions. The brake pedal becomes an input rather than a direct control to the EHB system. Consequently, determining the amount of braking intended by the driver becomes important to correct operation of the braking system and for providing feedback to the driver. Some EHB systems use a number of devices for determining the amount of braking intended by the driver. These devices include a pressure sensor or transducer exposed to the hydraulic fluid that goes to the wheel brakes. However, the sensed pressure may not directly correspond to the amount of pressure applied to the brake pedal for small travel events due to friction in the braking system or other variations.

It is known to use a Hall Effect sensor to sense a pressure imbalance between two braking circuits. A magnet within the hydraulic portion of the master cylinder is physically separated from the Hall Effect transducer that senses the position of the magnet. However, the Hall Effect transducer has a limited range of less than an inch for sensing the position of the magnet, and thus was used as a switch rather than for sensing a range of pressures.

It is known to sense brake pedal position directly, rather than hydraulic pressure for short travel events. In particular, contact transducers, such as resistive strip potentiometers, are mechanically connected to the brake pedal linkages. However, these contact transducers suffer from variations in signal output due to physical wear. Moreover, integration of noncontact sensors is complicated, first by the geometry of brake pedal linkages for different vehicles; second, the adjustment of a brake pedal to accord different users of the same vehicle type; and third by nonstandard brake pedals for the disabled (e.g., hand brake). Moreover, these portions of the braking system are often designed by different vendors, thereby further complicating the design effort.

Consequently, a significant need exists for brake pedal position sensing that can be readily integrated into a wide variety of vehicle types and that is less subject to performance variation.

SUMMARY OF THE INVENTION

The present invention addresses these and other problems in the prior art by providing a noncontact position sensor integral to a master cylinder for an automotive hydraulic braking system.

Thus, reliable brake pedal position information is readily provided without regard to the geometry and placement of the brake pedal input, thereby decreasing the complexity of integration into each type of automobile. An advantage of the present invention is that reliable performance of brake position sensing is provided by the use of non-contact sensors that are less subject to wear and performance variations, thereby providing a more reliable performance over a longer time than known sensors.

In one aspect of the invention, a hydraulic braking master cylinder includes a sensor for determining travel. In particular, the sensor includes a dual Hall Effect transducer arrangement to sense a magnet coupled to a piston. The dual transducers increase the length of travel that may be sensed.

In another aspect of the invention, the sensor further includes circuitry for determining the travel position based on the outputs from the dual transducers. In particular, based on the voltage levels from each transducer, the circuitry determines a region of operation and uses a linear approximation based on one of the two transducers appropriate for that region. Thereby, a complicated computation or lookup of the position based on a nonlinear representation of the transducer signals is avoided.

In yet another aspect of the invention, a sensor for determining travel senses a magnetic field of a magnet coupled to a member by spacing a first and second Hall Effect transducer spaced along a direction of travel of the member. A linear approximation is defined for each linear portion of output signals from each respective Hall Effect transducer. The linear approximation is a function of travel, sensor gain, and an offset. Determining travel based on the output signals is achieved by determining a region of operation by solving each linear approximation function with the related output signal and selecting a linear approximation with a lower magnitude. A signal representing travel is produced by solving the selected linear approximation for travel.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention together with a general description of the invention given above, as well as a detailed description of the embodiments given below, serve to explain the principles of the invention.

DETAILED DESCRIPTION OF SPECIFIC EMBODIMENTS

Figure 1:
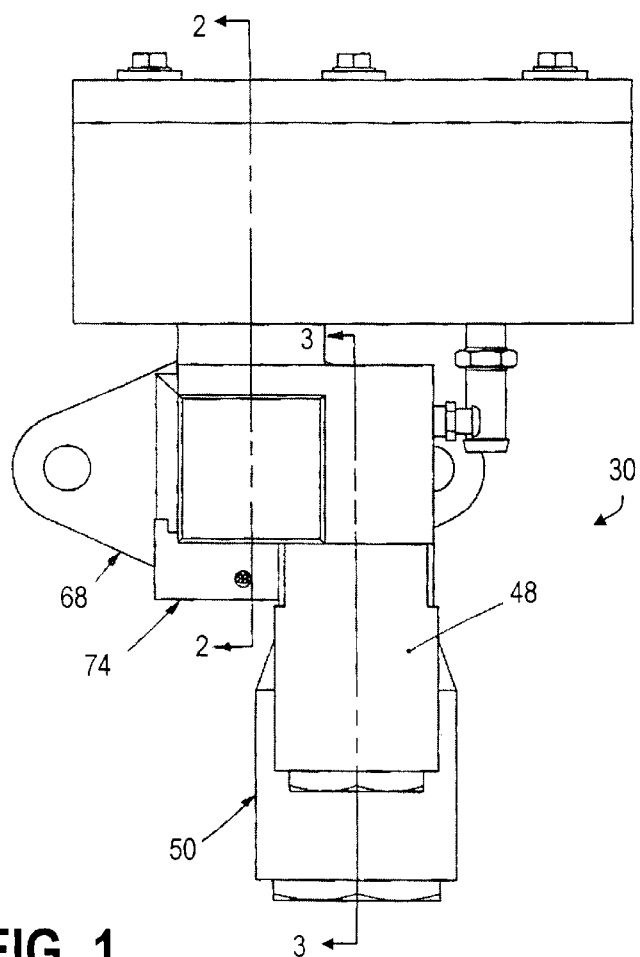
FIG. 1 is a front view of an illustrative two-port master cylinder with integral travel determination circuitry.
Figure 2:
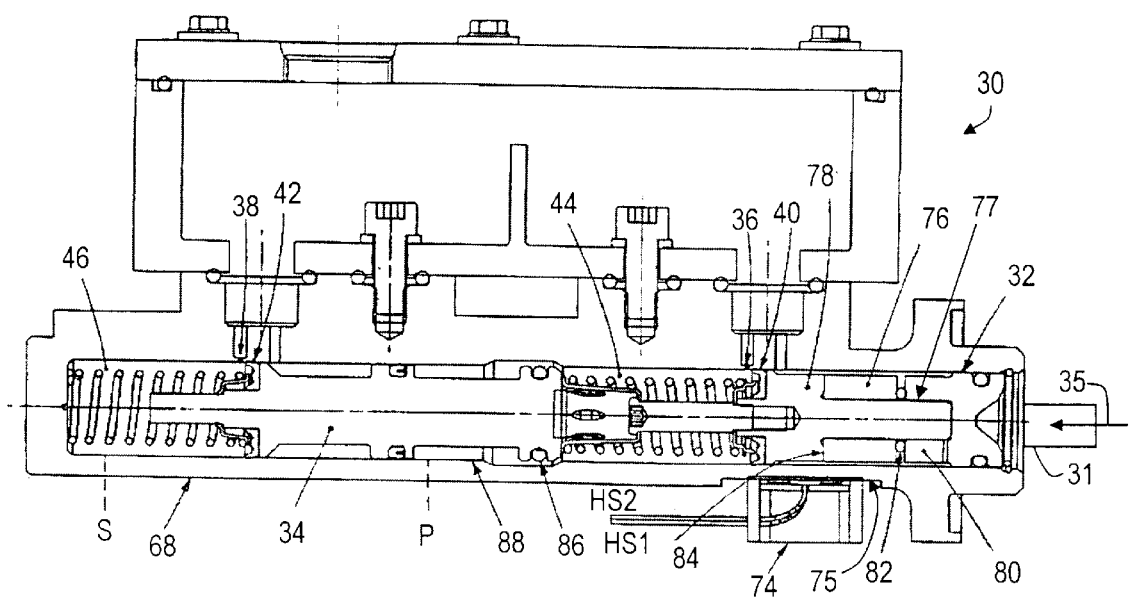
FIG. 2 is a cross-sectional side view along line 2—2 of the master cylinder of FIG. 1.
Figure 3:
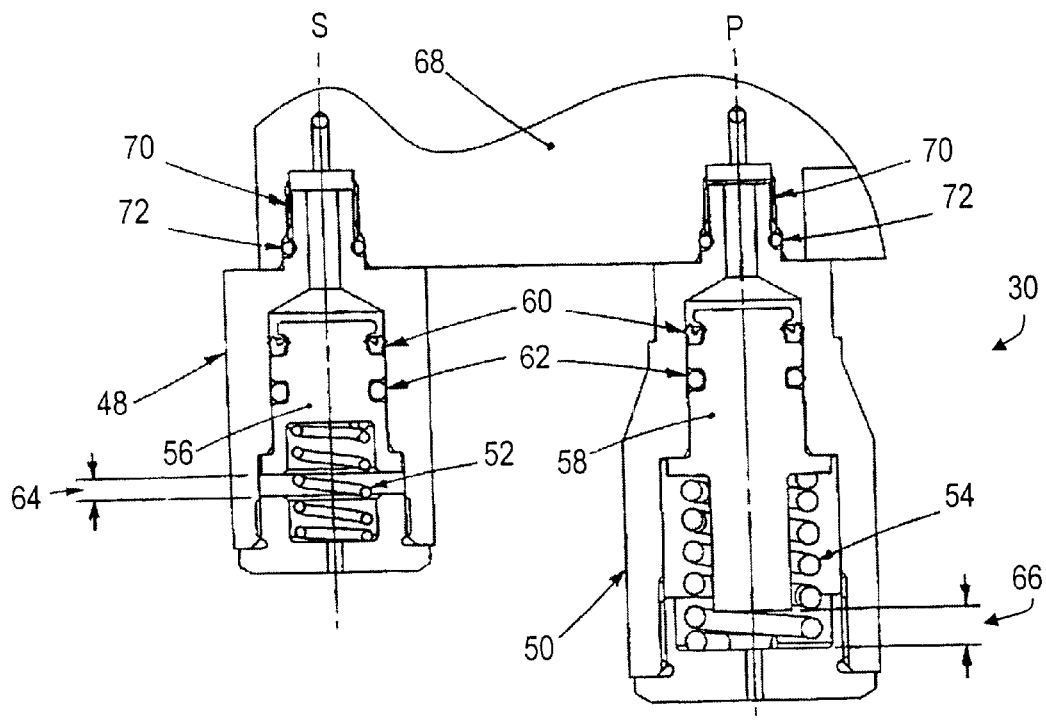
FIG. 3 is a cross-sectional side view along line 3—3 of the master cylinder of FIG. 1.

Turning to the Drawings, wherein like numbers refer to like parts throughout the several views, FIGS. 1–3 depict a braking master cylinder 30 for an automobile hydraulic wheel braking system (not shown) that includes both two-port master cylinder operation and pedal-feel emulation for use in an EHB system. Advantageously, the master cylinder 30 includes integral travel determination sensing that indirectly measures brake pedal travel used to interpret drive intent and command the appropriate level of wheel brake pressure.

With particular reference to FIG. 2, as an input force is applied to a push rod 31 originating from a brake pedal (not shown), a primary piston and magnet assembly 32 and secondary piston assembly 34 move to the left, as depicted by arrow 35. After bypass holes 36, 38 are covered by respective primary seals 40, 42, pressure begins to build in a primary chamber 44 and a secondary chamber 46. Because the braking master cylinder 30 is hydraulically isolated during normal powered operation, fluid begins to move from the secondary chamber 46 into a secondary emulator assembly 48 (shown in FIG. 3) via a fluid path "S". At a higher level of force from the push rod 31, sufficient pressure is generated in the primary chamber 44 for fluid to begin to move into a primary emulator assembly 50 (shown in FIG. 3) via a fluid path "P".

With particular reference to FIG. 3, the onset of travel and rate of travel of a secondary emulator spring 52 as well as a primary emulator spring 54 are based on vehicle specific pedal-feel requirements. Both emulator piston assemblies 56 and 58 include a lip seal 60 and an O-ring seal 62 to assure that brake fluid is sealed in the master cylinder 30 and that air does not enter the master cylinder 30 during vacuum evacuation. The displacement amounts of travel 64, 66 of both respective emulator assemblies 56 and 58 are also based on vehicle specific pedal-feel requirements. Each of the emulator assemblies 48 and 50 is attached to a master cylinder body or housing 68 by means of a threaded connection 70 and sealed with an O-ring seal 72.

Referring again to FIG. 2, a travel sensor assembly 74 is attached to a flat surface 75 on the bottom of the master cylinder body 68 by threaded fasteners (not shown). The travel sensor assembly 74 is non-contacting in nature and interacts with a magnetic field of a magnetic portion, depicted as a hollow cylindrical magnet 76, of the primary piston and magnet assembly 32. The intervening structure between the magnet assembly 32 and the travel sensor assembly 74, such as adjacent portions of the body 68, is advantageously nonferrous (e.g., aluminum and alloys thereof) and magnetically permeable so as to not significantly impede the magnetic field. A primary piston 77 of the primary piston and magnet assembly 32 consists of a front piston 78 and a rear piston 80 that are press fit together after the magnet 76 and an O-ring seal 82 are installed onto the front piston 78. The O-ring seal 82 is squeezed during assembly and maintains contact between the magnet 76 and a shoulder 84 of the front piston 78.

During non-power operation, the master cylinder 30 is not hydraulically isolated. Thus, fluid from primary chamber 44 and secondary chamber 46 is directed into the wheel brakes (not shown), as well as into the primary and secondary emulator assemblies 48 and 50. The additional travel of the secondary piston assembly 34 allows a lockout O-ring seal 86 to enter a main bore 88 of the master cylinder body 68 and reduce the travel associated with the primary emulator assembly 50. This results in less total pedal travel during non-power operation.

Figure 4:
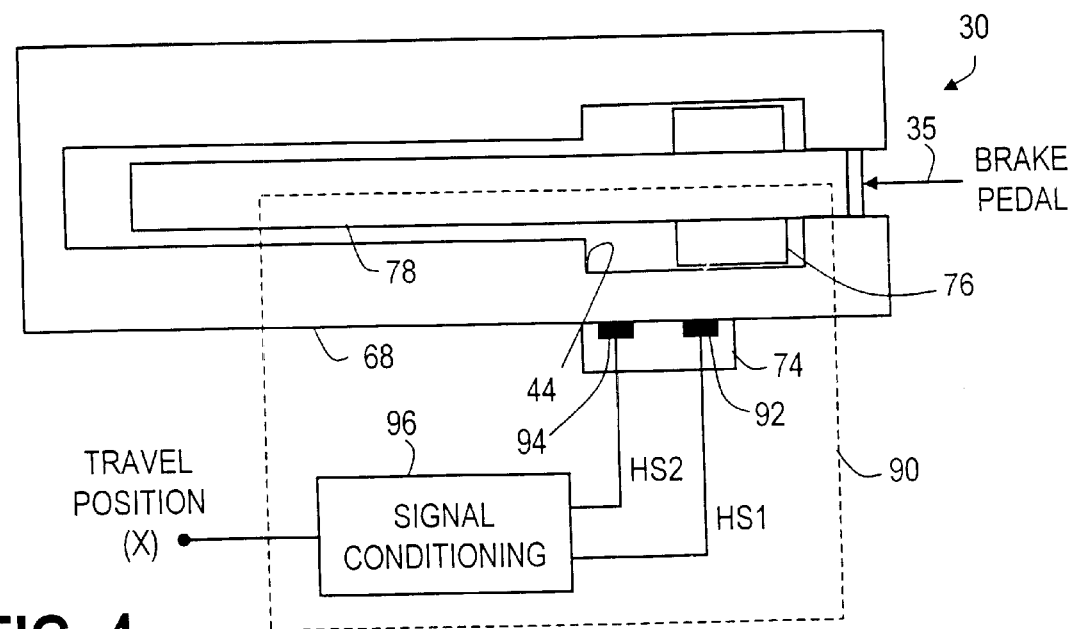
FIG. 4 is a diagram of the travel determination circuitry of the master cylinder of FIGS. 1–3.

FIG. 4 depicts travel determination circuitry 90 of the master cylinder 30 of FIGS. 1–3. The travel determination circuitry 90 includes at least two noncontact Hall Effect transducers 92, 94 in the travel sensor assembly 74, and each transducer 92, 94 is aligned along the direction of travel 35 of the magnet 76. The Hall Effect is the electromotive force generated in a strip of metal longitudinally conducting an electric current and subjected to a magnetic field normal to its major surface. Using movement of a magnet, and thus the change in magnetic field of the magnet, allows for noncontact sensing of motion of the piston 78.

The primary transducer 92 provides an output signal "HS1" and a secondary transducer 94 provides an output signal "HS2". Both signals HS1 and HS2 are processed by a signal conditioning circuit 94 to produce a travel position signal "X". By including a plurality of Hall Effect transducers 92, 94 as part of the travel determination circuitry 90, several advantages are realized. First, a larger range of travel may be detected than with a single transducer. In an illustrative embodiment, longitudinal spacing of 11 to 15 mm measures 22 to 30 mm of master cylinder piston travel than on a 4-to-1 pedal which corresponds to 88–120 mm of pedal travel. Second, using noncontact transducers eliminates a source of failure common to contact sensors that suffer from friction and contaminants. Third, integration of brake pedal travel determination into a vehicle is simplified by detecting the travel integral to the master cylinder, avoiding design variations in brake pedal mechanization.

Figure 5:
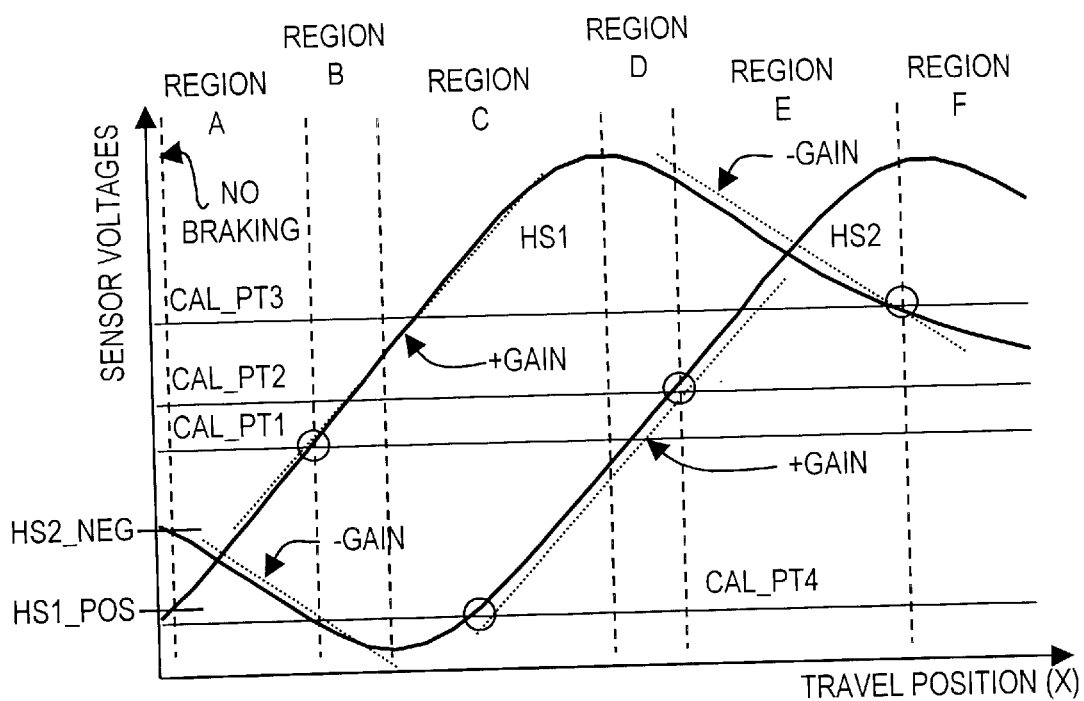
FIG. 5 is a plot of the analog outputs from the dual Hall Effect transducers of the travel determination circuitry of FIG. 4, annotated with control thresholds of a first signal conditioning circuit.
Figure 6:
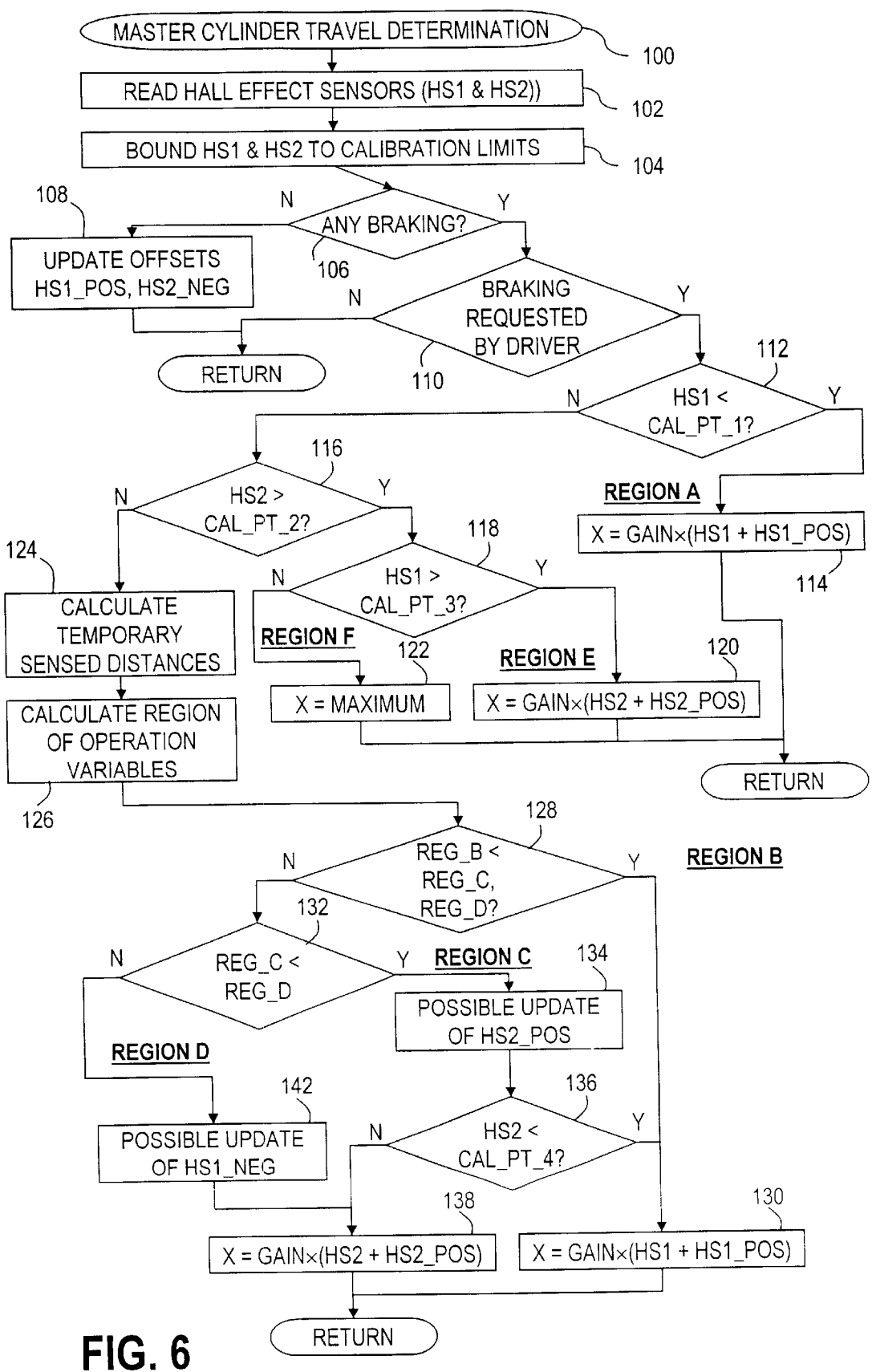
FIG. 6 is a sequence of operations performed by the first signal conditioning circuit of the travel determination circuitry of FIG. 4 in generating a travel position signal based on the analog outputs from the dual Hall Effect transducers.

As depicted in FIGS. 5–6, advantageous longitudinal spacing of the transducers 92, 94 of FIG. 4 allows for cost-effective implementation of the signal conditioning circuit 96 by having a linear portion of one of the output signals available in each region A–F for direct conversion to the travel position X. Thus, comparisons of voltage levels of output signals HS1 and HS2 to predetermined calibration points (voltage thresholds) provide a cost-effective and robust approach to obtaining brake pedal position. With particular reference to FIG. 5, the output signals HS1 and HS2 are shown to have substantial portions represented by one of three linear slopes defined by a sensor gain, either positive or negative for a given region, as well as by a voltage offset to define each linear slope in terms of the travel position X.

In the first illustrative embodiment, the negatively sloped portion of the HS2 output signal is not used. A second illustrative embodiment, discussed below, will make use of this region for extended travel determination. In addition, the approach may be extended to any desired length with additional transducers to obtain additional overlapping output signals. Alternatively or in addition, the magnetic field may be varied to lengthen the Hall Effect (i.e., longitudinally lengthen the magnet 76), and thereby allow greater spacing of the transducers, as will be discussed below for a second version of the signal conditioning circuit 94. "Flattening" of each output signal HS1 and HS2 in some applications may require processing with greater sensitivity to obtain adequate travel determination resolution. Alternatively, greater resolution may be obtained by shortening the magnet to create output signals HS1, HS2 having a sensor gain of a greater slope.

With particular reference to FIG. 6, a sequence of operations for determining the travel position X compares the output voltages (SENSOR VOLTAGES) to four calibration points (CAL_PT1, CAL_PT2, CAL_PT3, CAL_PT4) to determine the region of operation. With the region known, a determination can be made as to which output signal to use in calculating travel X, whether a positive or negative sensor gain should be used, the corresponding offset value, and whether the offset value may be updated.

It will be appreciated by those skilled in the art having the benefit of the present disclosure that the sequence of operations may be performed by a microcontroller or similar device integral to the master cylinder or remotely located in another portion of the vehicle. In addition, the sequence of operations may be performed by a microprocessor that performs other processing functions such as control of the overall braking system.

In particular, a routine 100 for master cylinder travel determination begins by reading the Hall Effect sensors (HS1, HS2) (block 102). The sensor signals are bound to the calibration limits of the transducers (block 104). Then, a determination is made as to whether any braking is occurring by sensing braking signals made available by the braking system (block 106). Typically, signals are available from a brake switch and a master cylinder pressure transducer that allow verification of proper sensor operation. In addition, the braking system may command braking when the driver has not depressed the brake pedal, such as for vehicle traction control.

If no braking signals are sensed in block 106, then an opportunity exists to update the offset values HS1_POS and HS2_NEG for the linear approximations for the positive slope portion of the HS1 output signal and the negative slope portion of the HS2 output signal, respectively (block 108). Before updating the offsets, a check is first made that the current value has changed more than a predetermined noise calibration value. Then, routine 100 returns to await the next update interval.

If braking is sensed in block 106, then a further determination is made as to whether the driver is requesting braking (block 110), as may be available from the braking system as a switched signal or may be based on a sensor signal above a threshold. If not, routine 100 returns. However, if braking is requested by the driver (i.e., the brake pedal is depressed), then the travel position X is determined.

First, a determination is made as to whether the first output signal HS1 is less than the first calibration point (CAL_PT1) (block 112). If so, the travel position X is in the first region (REGION A). Therefore, the determination of travel position X is based on the positive sloped linear approximation to the HS1 output signal ("X=+GAIN×(HS1+HS1_POS)") (block 114). Then routine 100 returns.

If, at block 112, the HS1 output signal is greater than CAL_PT1, then X is not in REGION A; and a further test is made to determine whether the HS2 output signal is greater than calibration point 2 (CAL_PT2) (block 116). If so, then the controller determines whether the HS1 output signal is greater than calibration point 3 (CAL_PT3) (block 118). If so, then the travel position is in REGION E and can be calculated from the positive sloped linear approximation to the HS2 output signal ("X=+GAIN×(HS2+HS2_POS)") (block 120). If not, the travel position X is deemed to be in REGION F which results in X being set to the maximum value (block 122). After either blocks 120 or 122, routine 100 returns.

If back at block 116, the HS2 output signal was less than calibration point 2, then the travel position is in one of three regions B–D wherein opportunities exist to select between the two output signals HS1, HS2, as well as to update the offset values. In block 124, the temporary sensed distances are calculated using each of four linear approximations that characterize the two output signals HS1, HS2:

$T1P = Temp\_Sensed\_HS1\_Pos = +Gain \times (HS1 + HS1\_Pos)$;

$T1N = Temp\_Sensed\_HS1\_Neg = -Gain \times (HS1 + HS1\_Neg)$;

$T2P = Temp\_Sensed\_HS2\_Pos = +Gain \times (HS2 + HS2\_Pos)$;

and $T2N = Temp\_Sensed\_HS2\_Neg = -Gain \times (HS2 + HS2\_Neg)$.

In order to compare which of the temporary sensed distances is closer to the actual travel position, in block 126 the following calibrations of the region of operation variables are made:

$Reg\_B = ABSOLUTE(T1P - T2N)$;

$Reg\_C = ABSOLUTE(T1P - T2P)$;

$Reg\_D = ABSOLUTE(T1N - T2P)$.

Based on these calibrations of blocks 124, 126, a determination is made as to whether the Region A variable (REG_B) is less than the other variables (REG_C, REG_D) (block 128). If so, the travel position X is in REGION B and the travel position X is based on the positively sloped linear approximation to the HS1 output signal ("X=+GAIN×(HS1+HS1_POS)") (block 130). Then routine 100 returns.

If REG_B was not the least in block 128, then a further determination is made as to whether region C variable (REG_C) is less than region variables D (REG_D) (block 132). If so, the travel position X is in REGION C and an opportunity exists to update offset value HS2_POS. Thus, if both output signals HS1 and HS2 are in their linear regions, then HS2_POS=−(HS1+HS1_POS) (block 134). Then a further determination is made as to which output signal HS1, HS2 should be used for travel determination. In particular, a determination is made as to whether the output signal HS2 is less than a calibration point 4 (CAL_PT4) (block 136). If so, travel position X is based on the positive sloped linear approximation to the output signal HS1 ("X=GAIN×(HS1+HS1_POS)") of block 130. Routine 100 then returns.

If back at block 136 output signal HS2 was not less than CAL_PT4, then the positive slope linear approximation to output signal HS2 is used ("X=+GAIN×(HS2+HS2_POS)") (block 138). Routine 100 then returns.

If back at block 132, region C variable was not less than region variables D, then travel position X is in region D which provides an opportunity to possibly update offset value HS1_NEG (block 142). The update is made if the value of output signal HS2 is within a range indicative of linear operation. Then HS1_NEG=−(HS2+HS2_POS). Thereafter, travel X position is based on the positive slope linear approximation to the output signal HS2 of block 138. Routine 100 then returns.

Figure 7:
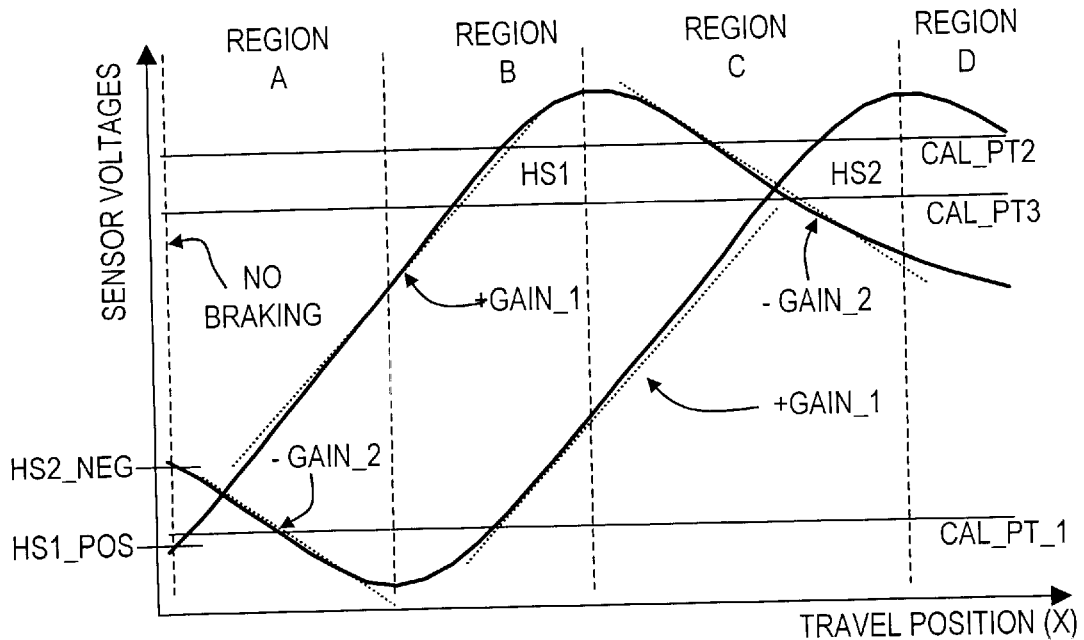
FIG. 7 is a plot of the analog outputs from the dual Hall Effect transducers of the travel determination circuitry of FIG. 4, annotated with alternative control thresholds of a second signal conditioning circuit.
Figure 8A:
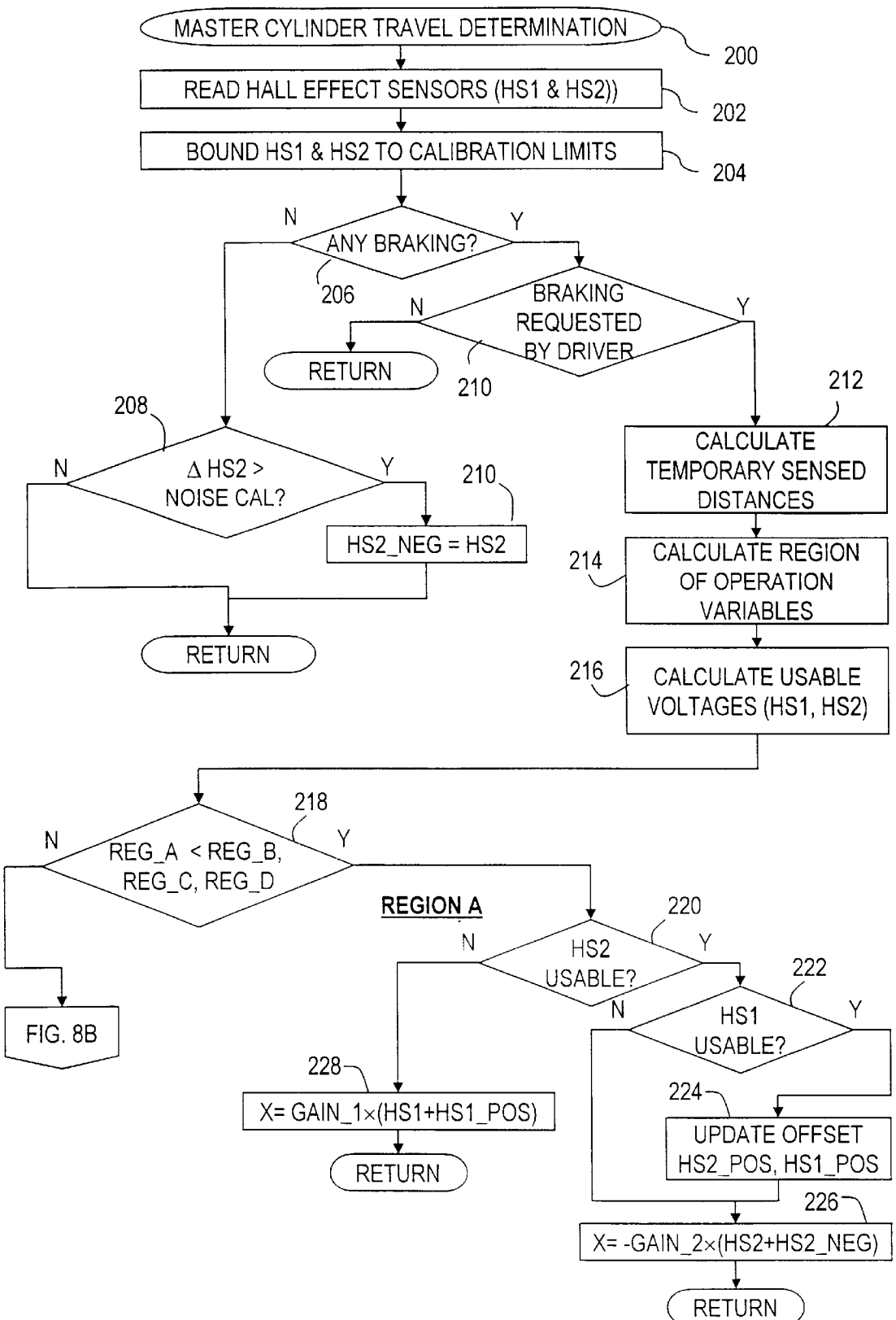
FIGS. 8A–8B are a sequence of operations performed by the second signal conditioning circuit of the travel determination circuitry of FIG. 4 in generating a travel position signal based on the analog outputs from the dual Hall Effect transducers.
Figure 8B:
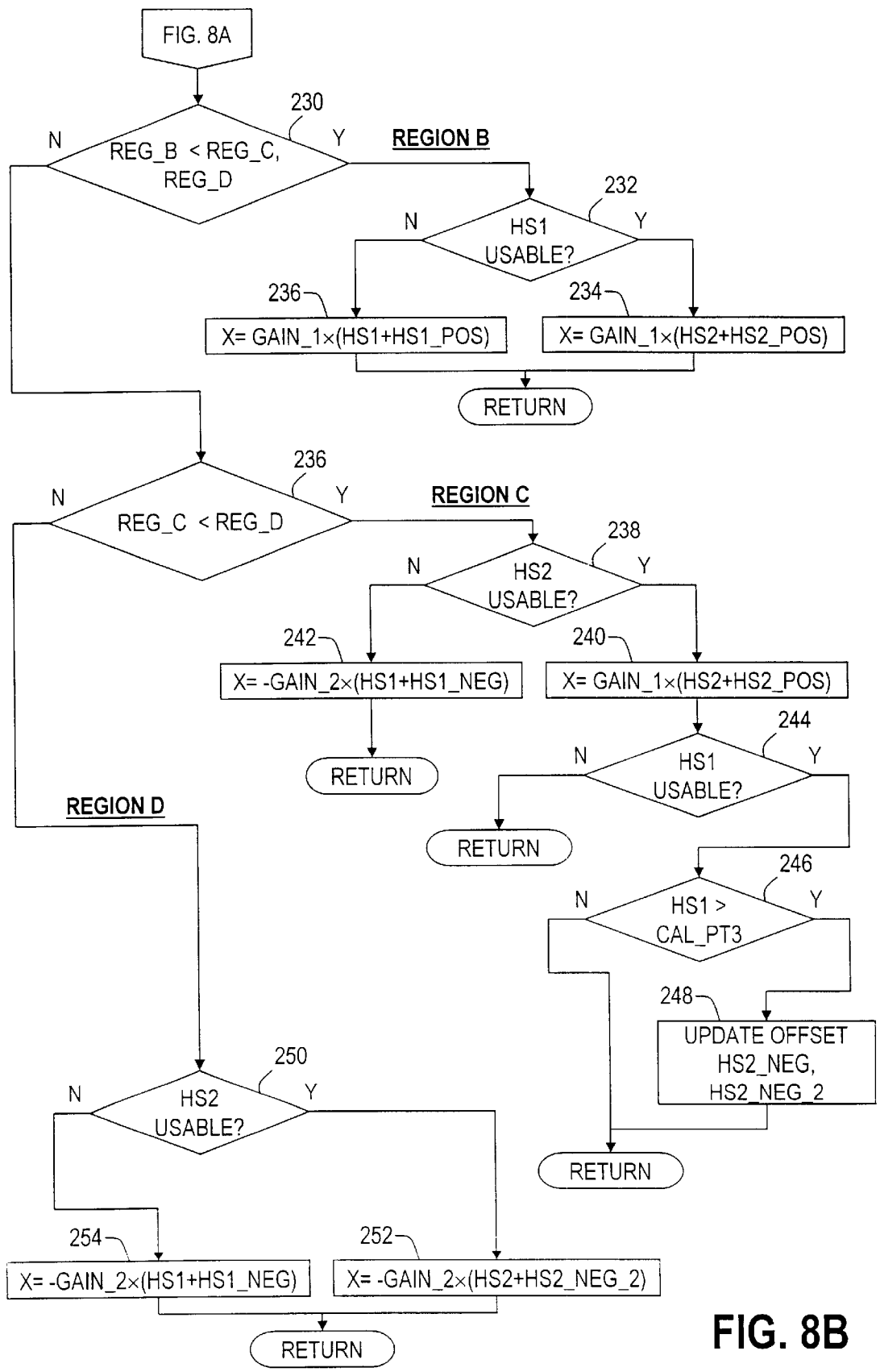

With reference to FIGS. 7, 8A and 8B, an alternative sequence of operations, depicted as routine 200 in FIG. 8A, advantageously determines master cylinder travel with a four region approach depicted in FIG. 7. The approach of selecting the appropriate linear approximation from the two output signals HS1, HS2 includes both negatively sloped portions of the second output signal HS2 to extend the range of sensed travel.

With particular reference to FIGS. 8A–8B, the routine 200 begins by reading the Hall Effect sensors (HS1, HS2), that are spaced approximately 11–15 mm apart (block 202). The sensor signals are bound to the calibration limits of the transducers (block 204). Then, a determination is made as to whether any braking is occurring by sensing braking signals made available by the braking system (block 206). Typically, signals are available from a brake switch and a master cylinder pressure transducer that allow verification of proper sensor operation. In addition, the braking system may command braking when the driver has not depressed the brake pedal, such as for vehicle traction control.

If no braking signals are sensed in block 206, then an opportunity exists to update the offset values HS2_NEG for the linear approximations for negative slope portion of the HS2 output signal (block 210). Before updating the offsets, a check is first made that the current value has changed more than a predetermined noise calibration value (block 208). Then, routine 200 returns to await the next update interval.

If braking is sensed in block 206, then a further determination is made as to whether the driver is requesting braking (block 210), as may be available from the braking system as a switched signal or may be based on a sensor signal above a threshold; if not, routine 200 returns. However, if braking is requested by the driver (i.e., the brake pedal is depressed), then the travel position X is determined.

In block 212, the temporary sensed distances are calculated using each of five linear approximations that characterize the two output signals HS1, HS2:

$$T1P = Temp\_Sensed\_HS1\_Pos = +Gain\_1 \times (HS1 + HS1\_Pos);$$

$$T1N = Temp\_Sensed\_HS1\_Neg = -Gain\_2 \times (HS1 + HS1\_Neg);$$

$$T2P = Temp\_Sensed\_HS2\_Pos = +Gain\_1 \times (HS2 + HS2\_Pos);$$

$$T2N = Temp\_Sensed\_HS2\_Neg = -Gain\_2 \times (HS2 + HS2\_Neg);$$

and $$T2N2 = Temp\_Sensed\_HS2\_Neg\_2 = -Gain\_2 \times (HS2 + HS2\_Neg\_2);$$

wherein Gain_1 corresponds to the magnitude of the positively sloped portions of the output signals (e.g., 3.5 mm/V) and Gain_2 corresponds to the magnitude of the negatively-sloped portions of the output signals (e.g., 6.1 mm/V). The difference in gain magnitudes for the positively and negatively sloped portions is due to the use of a more accurate slope for the negatively sloped portion. Thereby, the "–Gain_2" of negatively-sloped portions may be additionally used for travel determination, whereas the previously described approach in FIGS. 5–6 used the negatively-sloped portions only for area determination.

In order to compare which of the temporary sensed distances is closer to the actual travel position, in block 214 the following calibrations of the region of operation variables are made:

$$Reg\_A = ABSOLUTE(T1P - T2N);$$

$$Reg\_B = ABSOLUTE(T1P - T2P);$$

$$Reg\_C = ABSOLUTE(T1N - T2P);$$

and $$Reg\_D = ABSOLUTE(T1N - T2N2).$$

Then, the output signals HS1, HS2 are compared to lower threshold CAL_PT1 and upper threshold CAL_PT2, with a usable output signal designated if between these thresholds (block 216).

With particular reference to FIG. 8B, thereafter, a series of determinations are made based on the region of operation variables (REG_A–REG_D) to determine which of the four regions A–D are appropriate for determining travel. In particular, if REG_A is less than the other three variables (block 218), then the Region A is determined. Thus, if HS2 is usable (block 220) and HS1 is usable (block 222), then an opportunity exists to update the offsets HS1_POS and HS2_POS for the respective linear approximations for the respective positively sloped portions of each output signal HS1, HS2 (block 224):

$$HS1\_POS = (T2N)/(-Gain\_2) - HS1;$$

$$HS2\_POS = (T2N + Spacing)/(Gain\_1) - HS1;$$

wherein "Spacing" is the spacing between the transducers. Thereafter, or if HS1 was not usable in block 222, then the travel determination X is based on left-most negatively-sloped portion of output signal HS2 (block 226):

$$X = -GAIN\_2 \times (HS2 + HS2\_NEG).$$

Returning back to block 220, if in Region A but output signal HS2 is not usable, then the travel determination X is based on the positively sloped portion of output signal HS1 (block 228):

$$X = GAIN\_1 \times (HS1 + HS1\_POS).$$

After X is set in either block 226 or 228, routine 200 returns to await the next update period.

If not deemed to be in Region A in block 218, then variable REG_B is compared to variables REG_C, REG_D. If REG_B is less, then travel determination is based on being in Region B (block 230). Thus, if output signal HS1 is usable (block 232), then the travel determination X is based on the positively-sloped portion of output signal HS2 (block 234):

$$X = Gain\_1 \times (HS2 + HS2\_POS).$$

Else, the travel determination X is based on the positively-sloped portion of output signal HS1 (block 236):

$$X = Gain\_1 \times (HS1 + HS1\_POS).$$

After X is set in either block 234 or 236, routine 200 returns to await the next update period.

If not deemed to be in Region B in block 230, then variable REG_C is compared to variable REG_D. If REG_C is less, then travel determination is based on being in Region C (block 236).

Thus, if output signal HS2 is usable (block 238), then the travel determination X is based on the positively-sloped portion of output signal HS2 (block 240):

$$X = Gain\_1 \times (HS2 + HS2\_POS).$$

Else, the travel determination X is based on the right-most negatively-sloped portion of output signal HS1 (block 242):

$$X = -Gain\_2 \times (HS1 + HS1\_NEG).$$

Returning to block 240, an opportunity exists for updating the offsets HS1_NEG, HS2_NEG_2 for the right-most negatively-sloped portions of output signals HS1 and HS2. In particular, if HS1 is usable (block 244) and greater than a threshold CAL_PT3 (block 246), then output signal HS2 is approximately linear and positively sloped (block 248):

$$HS1\_NEG = (T2P)/(-Gain\_2) - (HS1);$$

$$HS2\_NEG\_2 = (T2P + Spacing)/(-Gain\_2) - (HS1).$$

Routine 200 returns to await the next update period after either X is set in block 242, output signal HS1 is not usable in block 244, output signal HS1 is not above CAL_PT3 in block 246, or after updating the offsets in block 248.

If not deemed to be in Region C in block 236, then travel determination is based on being in Region D. Thus, if output signal HS2 is usable (block 250), then the travel determination X is based on the right-most negatively-sloped portion of output signal HS2 (block 252):

$$X = -Gain\_2 \times (HS2 + HS2\_NEG\_2).$$

Else, the travel determination X is based on the right-most negatively-sloped portion of output signal HS1 (block 254):

$$X = -Gain\_2 \times (HS1 + HS1\_NEG).$$

Routine 200 returns to await the next update period after either X is set in block 252, 254.

In use, a driver depresses the brake pedal of the vehicle, causing a push rod 31 to the braking master cylinder 30 to move a front piston 78 and its attached magnet 76 inwardly. Outside of the magnetically permeable master cylinder body 68, a plurality of Hall Effect transducers 92, 94 aligned with the direction of travel 35 sense the magnetic field of the magnet 76. Signal conditioning circuit 96 compares output signals HS1, HS2 from the transducers 92, 94 to several calibration points (voltage thresholds) to determine which output signal is within a linear operating region and outputs a travel position X for use in the braking system based on a linear approximation to the output signal for the determined operating region.

By virtue of the foregoing, a master cylinder 30 integrally measures a brake pedal input with an integral, noncontact sensor, in particular, dual Hall Effect transducers 92, 94, increasing reliability and simplifying integration of an automotive braking system. Furthermore, longitudinal spacing of the transducers 92, 94 advantageously enables an efficient calibration of travel position based on linear approximations to the output signals of the transducers.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of applicant's general inventive concept.

What is claimed is:

1. A braking master cylinder for an automotive electro-hydraulic braking system that responds to operation of a brake pedal, the braking master cylinder comprising:
    a cylinder housing having a main bore;
    a piston slidingly received for movement in the main bore and longitudinally positioned by the brake pedal;
    a magnet coupled to the piston; and
    a noncontact sensor coupled to the cylinder housing for generating a position signal corresponding to proximity of the noncontact sensor to the magnet;
    wherein the noncontact sensor comprises at least two Hall Effect transducers longitudinally spaced and proximate to the main bore; and
    further wherein each Hall Effect transducer produces an output signal having a positively sloped linear region and a negatively sloped linear region, the longitudinal spacing of adjacent transducers selected to have at least one linear region available from at least one transducer for each position of the magnet.

2. The braking master cylinder of claim 1, wherein at least two Hall Effect transducers are longitudinally spaced about 11 to 15 mm for detecting a piston travel of about 22–30 mm.

3. The braking master cylinder of claim 1, further comprising signal conditioning circuitry responsive to output signals from the at least two Hall Effect transducers to select a more linear output from the at least two transducer signals and to output a position signal corresponding to the more linear output.

4. A braking master cylinder for an automotive electro-hydraulic braking system that responds to operation of a brake pedal, the braking master cylinder comprising:
    a cylinder housing having a main bore and including a nonferrous portion;
    a piston slidingly received for movement in the main bore and longitudinally positioned by the brake pedal, the piston having a magnetic portion positioned to produce a magnetic field through the nonferrous portion of the cylinder housing;
    at least two Hall Effect transducers attached to the cylinder housing and longitudinally spaced to sense the magnetic field, each transducer producing an output signal having a positively sloped linear region and a negatively sloped linear region, the longitudinal spacing of adjacent transducers selected to have at least one linear region available from at least one transducer for each position of the magnetic portion of the piston; and
    signal conditioning circuitry responsive to output signals from at least two Hall Effect transducers to select a more linear output from the at least two transducer signals and to output a position signal corresponding to the more linear output.

5. A method of determining pedal travel of a brake pedal in a vehicle having a braking master cylinder of an electro-hydraulic braking system, the braking master cylinder having a piston slidingly received within a main bore of a cylinder housing and positioned by the brake pedal, the method comprising:
    sensing a magnetic field from a magnetic portion of the piston with a first and second Hall Effect transducer spaced along a direction of travel of the piston, each transducer producing an output signal with at least one linear portion, the spacing selected such that a selected linear portion of an output signal is available from at least one of the first and second Hall Effect transducers for each position of the piston;
    selecting a linear output from one of the at least two output signals by comparing at least one of the two output signals to a threshold; and
    generating a position signal for the piston based on a selected linear approximation for the selected linear portion of the output signal.

6. A method of determining travel of a member coupled to a magnet comprising:
    sensing a magnetic field from the magnet with a first and second Hall Effect transducer spaced along a direction of travel of the member, each transducer producing a respective output signal with at least one linear portion, the spacing between transducers selected such that a selected linear portion of the output signal is available from at least one of the first and second Hall Effect transducers for each position of the piston;

determining a linear approximation as a function of travel for each linear portion of each output signal that is a function of a sensor gain and an offset;

determining a region of operation by solving each linear approximation function with the related output signal and selecting a linear approximation function with a lower magnitude; and generating a signal representing the travel of the member by solving the selected linear approximation for travel.

* * * * *